United States Patent [19]

Ichihara

[11] Patent Number: 4,841,301

[45] Date of Patent: Jun. 20, 1989

[54] DEVICE OPERABLE LIKE AN AUTOMATIC LEVEL CONTROL CIRCUIT FOR DECODING A MULTIVALUED SIGNAL

[75] Inventor: Masaki Ichihara, Tokyo, Japan

[73] Assignee: NEC Corporation, Japan

[21] Appl. No.: 126,864

[22] Filed: Nov. 30, 1987

Related U.S. Application Data

[63] Continuation of Ser. No. 716,581, Mar. 27, 1985, abandoned.

[30] Foreign Application Priority Data

Mar. 30, 1984 [JP] Japan ................................. 59-60842

[51] Int. Cl.$^4$ ............................................. H03M 1/18
[52] U.S. Cl. ..................................... 341/126; 375/20; 375/98; 328/151; 341/139; 341/57
[58] Field of Search ..................... 375/20, 98; 328/157; 341/126, 57

[56] References Cited

U.S. PATENT DOCUMENTS

| | | | |
|---|---|---|---|
| 3,509,279 | 4/1970 | Martin et al. ........................ | 375/98 |
| 3,864,529 | 2/1975 | Tracey et al. ....................... | 375/20 |
| 4,161,628 | 7/1979 | McRae .............................. | 375/98 X |
| 4,376,309 | 3/1983 | Fenderson et al. .................. | 375/101 |

*Primary Examiner*—William M. Shoop Jr.
*Assistant Examiner*—Helen Goh
*Attorney, Agent, or Firm*—Laff, Whitesel, Conte & Saret

[57] ABSTRACT

In a device which is for use in a receiver of a multivalued digital communication system and which includes a reference voltage producing circuit (51) for producing signal discriminating reference voltages and signal regenerating reference voltages related to one another, a level discriminating circuit (31) for discriminating a multivalued received signal with reference to the signal discriminating reference voltages to produce a local encoded signal, a signal decoding circuit (32) for decoding the local encoded signal into a decoded signal, a signal regenerating circuit (33) responsive to the local encoded signal for regenerating a multivalved regenerated signal having the signal regenerating reference voltages, a comparator (34) for comparing the received and the regenerated signals to produce a result of comparison, and an integrator (35) for integrating the result of comparison to produce a result of integration, the signal discriminating and regenerating reference voltages are regulated by the result of integration. Preferably, an operational amplifier (52) makes a voltage divider produce the signal discriminating and regenerating reference voltages with the signal discriminating voltages made to have a center voltage at a predetermined level. The voltage divider is subjected to feedback control by the result of integration. By way of example, one of the signal regenerating reference voltages is rendered equal to the result of integration.

5 Claims, 4 Drawing Sheets (A)

(B)

| A | M | L |
|---|---|---|
| 21 < A | 1 | 0 |
| 22 < A < 21 | 1 | 1 |
| 23 < A < 22 | 0 | 1 |
| A < 23 | 0 | 0 |

(C)

(D)

| M | L | R |
|---|---|---|
| 1 | 0 | R = 26 |
| 1 | 1 | R = 27 |
| 0 | 1 | R = 28 |
| 0 | 0 | R = 29 |

(E)

| A | A/R | S | T |
|---|---|---|---|
| A > 0 | A > R | $|A| > |R|$ | $T = +V_{DD}$ |
| A > 0 | A < R | $|A| < |R|$ | $T = -V_{DD}$ |
| A < 0 | A > R | $|A| < |R|$ | $T = -V_{DD}$ |
| A < 0 | A < R | $|A| > |R|$ | $T = +V_{DD}$ |

DEVICE OPERABLE LIKE AN AUTOMATIC LEVEL CONTROL CIRCUIT FOR DECODING A MULTIVALUED SIGNAL

This application is a continuation of application Ser. No. 06/716,581, filed March 27, 1985 now abandoned.

BACKGROUND OF THE INVENTION

This invention relates to a device for use in a receiver of a multivalued or multilevel digital communication system in decoding a received multivalued signal into a decoded signal, namely, into a sequence of data. The multivalued digital communication system may be a frequency shift keying (FSK) or phase shift keying (PSK) communication system.

Supplied with a multivalued digital signal from a transmitter of the communication system, the receiver produces the received multivalued signal in the manner known in the art. A decoder decodes the received multivalued signal with reference to a plurality of signal discriminating reference voltages or levels. When the reference voltages are fixed and are not adjustable, the received multivalued signal is not correctly decoded because a modulator of the transmitter has a modulation degree which is inevitably subjected to secular change and fluctuates with the ambient temperature and because the received multivalued signal has a similarly varying amplitude. This unavoidably results in an increased error rate.

In order to get rid of such undesirable effects, the decoder comprises circuitry for use in automatically controlling the amplitude of the received multivalued signal to a predetermined value. The circuitry is generally called an automatic level control (ALC) circuit.

In the manner which will later be described more in detail, the automatic level control circuit comprises a voltage controlled variable gain amplifier responsive to a control voltage for giving the predetermined value to the amplitude of a signal which is derived from the received multivalued signal as a gain controlled signal. The variable gain amplifier comprises a voltage controlled variable resistance (VCR) or impedance element. Inasmuch as the voltage controlled variable resistance element ordinarily has nonlinear characteristics, the gain controlled signal is subjected to a considerable amount of distortion depending on the amplitude of the received multivalued signal. Furthermore, the decoder has a dynamic range which is restricted by an operational range of the voltage controlled variable resistance element and fluctuations of the operational range. These have made it imposslbe for a conventional decoder to have an appreciably reduced error rate and to cope with a wide amplitude range of the received multivalued signal.

SUMMARY OF THE INVENTION

It is therefore an object of the present invention to provide a device for use in a receiver of a multivalued digital communication system, which device is equivalent to an automatic level control circuit hitherto used in decoding a received multivalued signal into a decoded signal.

It is another object of this invention to provide a device of the type described, which produces the decoded signal with a reduced error rate.

It is still another object of this invention to provide a device of the type described, which has a wide dynamic range.

A device to which this invention is applicable, is for use in decoding a received multivalued signal to produce a decoded signal and includes a reference voltage producing circuit for producing a plurality of signal discriminating reference voltages and a plurality of signal regenerating reference voltages related to one another, a level discriminating circuit responsive to the signal discriminating reference voltages for discriminating the received multivalued signal to produce a local encoded signal, a signal decoding circuit for decoding the local encoded signal into the decoded signal, a multivalued signal regenerating circuit responsive to the signal regenerating reference voltages and the local encoded signal for regenerating a regenerated multivalued signal, a comparator for comparing the received and the regenerated multivalued signals to produce a result of comparison, and an integrator for integrating the result of comparison to produce a result of integration. According to this invention, the device is characterised by voltage regulating means responsive to the result of integration for regulating the signal discriminating and regenerating reference voltages.

It will be understood from the above that the voltage regulating means is operable to adjust the signal discriminating and regenerating reference voltages in accordance with the received multivalued signal and to give an adjusted level to the regenerated multivalued signal.

DESCRIPTION OF THE PREFERRED EMBODIMENT

Figure 1:
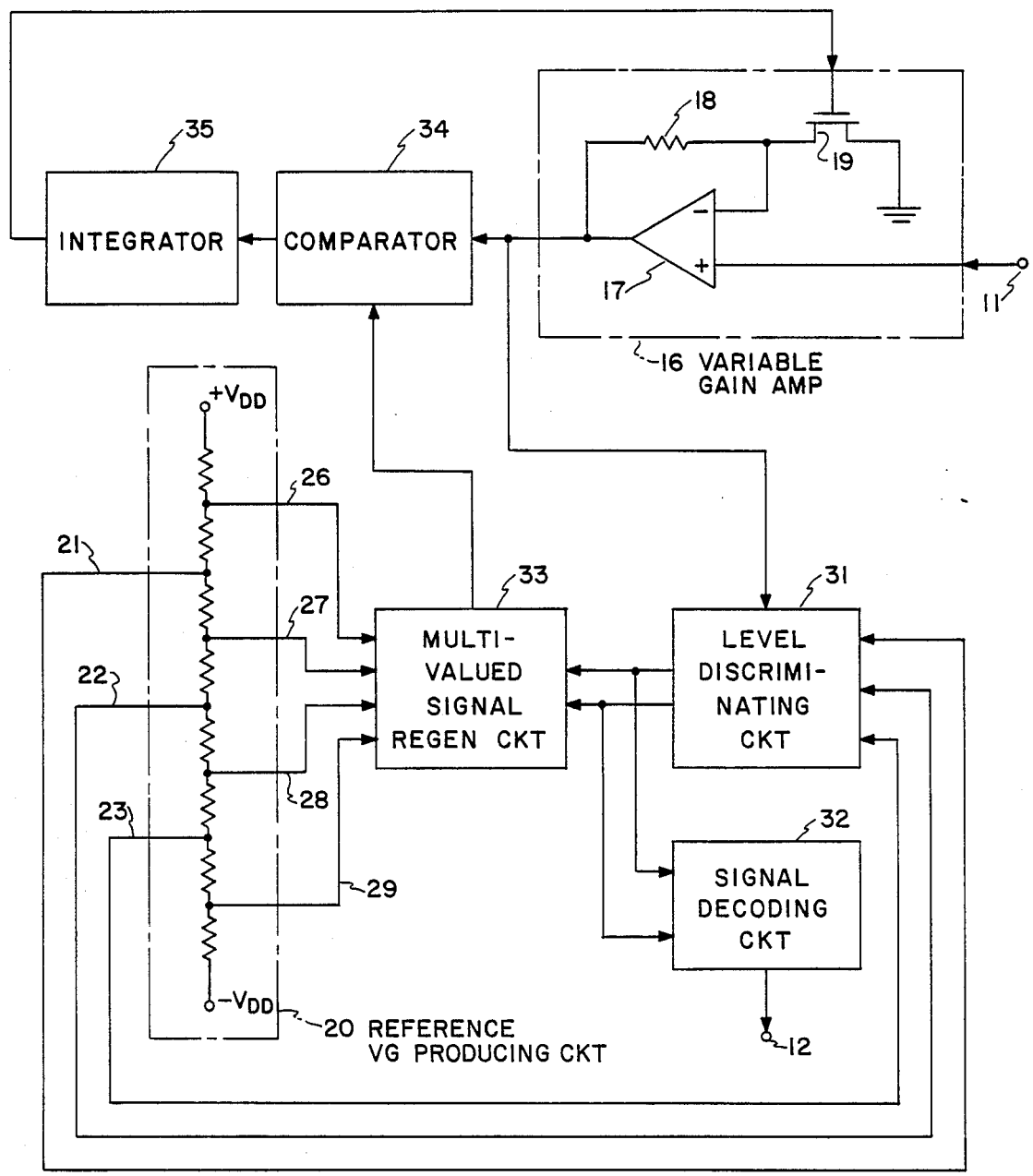
FIG. 1 is a block diagram of a conventional automatic level control circuit.

Referring to FIG. 1, an automatic level control (ALC) circuit will be described at first in order to facilitate an understanding of the present invention. The automatic level control circuit is for use in a conventional receiver of a multivalued or multilevel digital communication system.

In response to a multivalued digital signal transmitted from a transmitter of the communication system, the receiver produces a received multivalued signal in the manner known in the art. The automatic level control circuit has circuit input and output terminals 11 and 12 which is supplied with the received signal and at which a decoded or data signal is obtained, respectively. Merely for simplicity of description, it will be assumed that the received signal is a four-level received signal of a certain amplitude or level.

In the automatic level control circuit, a voltage controlled variable gain amplifier 16 is controlled by a control voltage which will presently become clear. Responsive to the four-level received signal, the variable gain amplifier 16 produces a four-level gain controlled signal. The variable gain amplifier 16 comprises an operational amplifier 17 having an amplifier output terminal, a first input terminal supplied with the received signal, and a second input terminal connected to the amplifier output terminal through a resistor 18. An FET (field effect transistor) 19 is connected between the second input terminal and a point of a predetermined voltage or potential, such as earth potential, and has a gate electrode to which the control voltage is applied. The gain controlled signal is derived at the amplifier output terminal. Four levels which are had by the gain controlled signal and are collectively called the amplitude or level heretobefore, are symmetrical on both sides of the predetermined voltage.

A reference voltage producing circuit 20 comprises a voltage divider between positive and negative terminals $V_{DD}$ and $-V_{DD}$ of a power source (not shown). The voltage divider produces first through third signal discriminating reference voltages 21, 22, and 23 and first through fourth signal regenerating reference voltages 26, 27, 28, and 29. Being produced by the voltage divider, the reference voltages 21 through 23 and 26 through 29 are related to one another. The second signal discriminating reference voltage 22 has an average voltage of the first and the third signal discriminating reference voltages 21 and 23 and is equal to the predetermined voltage.

With reference to the signal discriminating reference voltages 21 through 23, a level discriminating circuit 31 discriminates the four-level gain controlled signal and produces first and second parallel encoded signal which may collectively be called a local encoded signal. Responsive to the local encoded signal, a signal decoding circuit 32 delivers the decoded signal to the circuit output terminal 12. In the example being illustrated, the signal decoding circuit 32 is a four-value to two-value converting circuit.

Responsive to the local encoded signal, a multivalued signal regenerating circuit 33 regenerates a four-level regenerated signal with reference to the signal regenerating reference voltages 26 through 29. The regenerated signal is similar to the gain controlled signal. The signal regenerating reference voltages 26 to 29 are selected to be eye pattern center voltages of the four-level regenerated signal, respectively.

A comparator 34 is for comparing the regenerated and the gain controlled signals to produce a result of comparison. An integrator 35 is for integrating the result of comparison to produce a result of integration as the above-mentioned control voltage. By way of example, the result of comparison is indicated by a low and a high voltage when the gain controlled signal has a greater and a smaller amplitude, respectively, than the regenerated signal. Under the circumstances, the gain controlled signal is given a greater and a smaller amplitude when the received signal has a smaller and a greater amplitude, respectively. The gain controlled signal is thereby given a substantially constant amplitude decided by the signal discriminating and regenerating reference voltages 21 through 23 and 26 through 29 irrespective of variations in the received signal amplitude.

It may appear from the foregoing that an automatic control loop is formed for carrying out negative feedback on the received signal to make the gain controlled signal have a predetermined amplitude. The automatic level control circuit, however, has the defects pointed out hereinabove.

Figure 2:
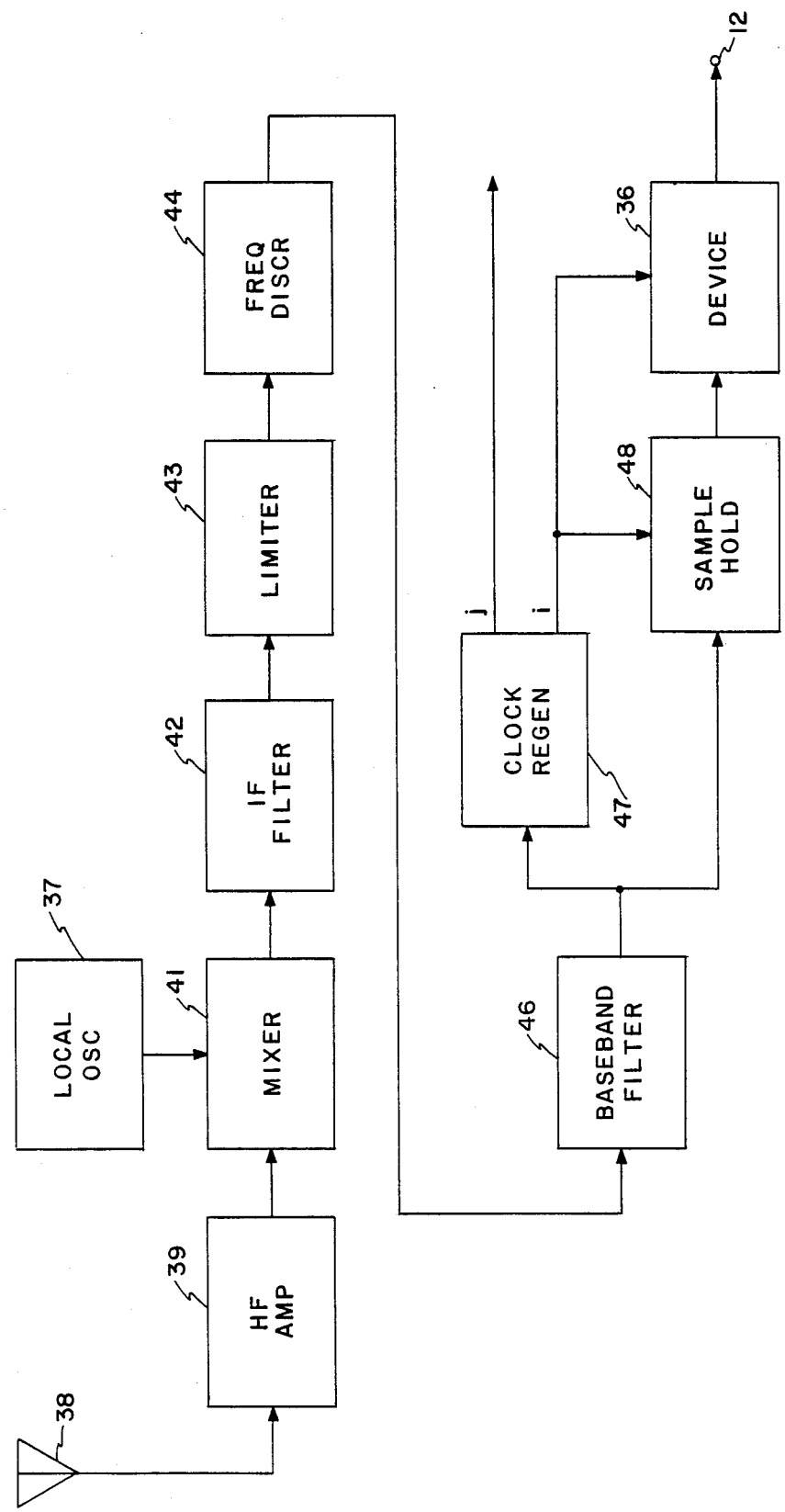
FIG. 2 is a block diagram of a receiver which is for use in a multivalued digital communication system and comprises a device according to the instant invention.

Turning to FIG. 2, a receiver comprises a device 36 according to this invention and is for use in a multivalued digital communication system. Supplied with a multivalued digital signal from a transmitter of the communication system, the receiver makes the device 36 deliver a decoded or data signal to a device output terminal which corresponds to the above-mentioned circuit output terminal 12 and will therefore be designated by the reference numeral 12. The receiver comprises a radio frequency circuit which is not different from a usual FM receiver.

In FIG. 2, the radio frequency circuit comprises a local oscillator 37 for generating a local signal and is of the single superheterodyne type known in the art. More particularly, the multivalued digital signal reaches a reception antenna 38, amplified by a high frequency amplifier 39, and mixed with the local signal at a mixer 41 into a mixer output signal. An intermediate frequency filter 42 is for producing an intermediate frequency signal from the mixer output signal. The intermediate frequency signal is amplitude limited by a limiter 43 and processed by a frequency discriminator 44, which produces a baseband signal. The radio frequency circuit may be of any other type, such as the double superheterodyne type.

A baseband filter 46 is for band limitation and waveform equalization of the baseband signal and produces a baseband filter output signal. A clock regenerator 47 is a known circuit and is responsive to the baseband filter output signal for regenerating first and second timing clock sequences i and j for symbol synchronization and bit synchronization, respectively. A sample hold circuit 48 is responsive to the first timing clock sequence i for sampling the baseband filter output signal into samples and for holding the samples to deliver a received multivalued signal to the device 36. The second timing clock sequence j is used elsewhere in the receiver in the manner known in the art. The first timing clock sequence i is fed to the device 36 in the manner which will shortly become clear.

Figure 3:
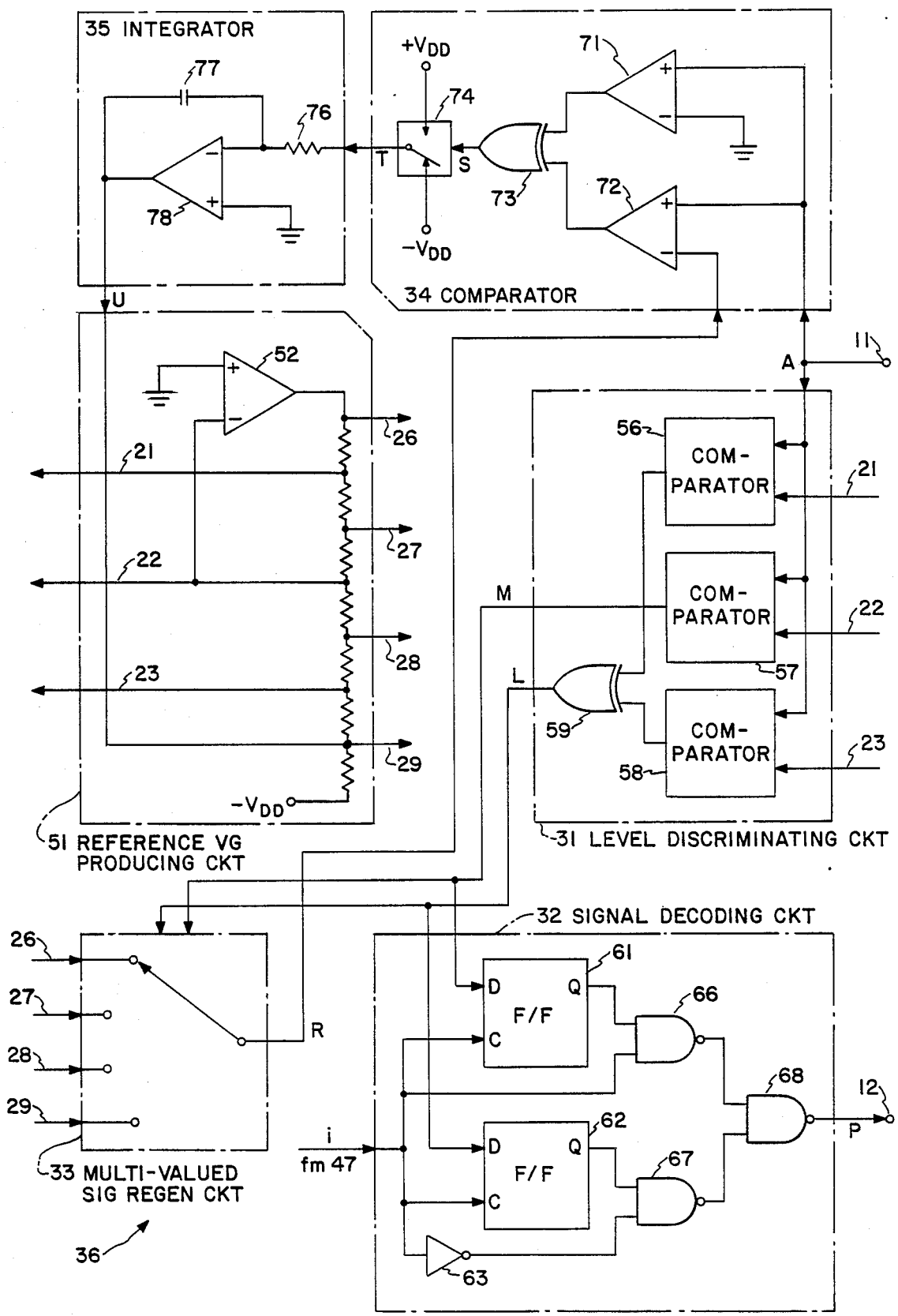
FIG. 3 is a block diagram of a device according to an embodiment of this invention.

Referring now to FIG. 3, a device according to an embodiment of this invention comprises similar parts which are designated by like reference numerals. The device being illustrated, may be used as the device 36 described above in conjunction with FIG. 2.

A device input terminal corresponds to the circuit input terminal 11 described in connection with FIG. 1 and will be designated by the reference numeral 11. It is to be noted that the device includes neither the voltage controlled variable gain amplifier 16 (FIG. 1) nor the voltage controlled variable resistance (VCR) or impedance element. The received multivalued signal is delivered directly to the level discriminating circuit 31 and the comparator 34. It will again be presumed that the received signal is a four-level received signal. In the manner described before, four levels of the received signal are symmetric on both sides of a predetermined voltage or potential.

A reference voltage producing circuit 51 is different in structure from the reference voltage producing circuit 20 described in conjunction with FIG. 1. Despite the defference in structure, the reference voltage producing circuit 51 produces first through third signal discriminating reference voltages and first through fourth signal regenerating reference voltages which are used like the corresponding reference voltages 21 through 23 and 26 through 29 and are therefore designated by such reference numerals and which will be described more in detail as the description proceeds.

The reference voltage producing circuit 51 comprises an operational amplifier 52 having an amplifier output terminal, a first input terminal connected to the predetermined voltage, and a second input terminal supplied with a center voltage which the first through the third signal discriminating voltages 21 to 23 have and which should be equal to the predetermined voltage. In the example being illustrated, the center voltage is had by the second signal discriminating reference voltage 22. The operational amplifier 52 produces an output voltage at the amplifier output terminal.

A voltage divider is connected between the output terminal of the operational amplifier 52 and the negative terminal $-V_{DD}$ and produces the reference voltages 21 through 23 and 26 through 29. The output voltage of the operational amplifier 52 becomes approximately equal to the voltage of the positive terminal $V_{DD}$ (FIG. 1). The voltage divider is supplied with the result of integration of the type described above and will be exemplified more in detail in the following. The reference voltages 21 to 23 and 26 to 29 are therefore not fixed but are adjustable by the result of integration. In compliance with adjustment of the reference voltages 21 to 23 and 26 to 29, the output voltage is regulated to keep the center voltage always equal to the predetermined voltage.

Figure 4:
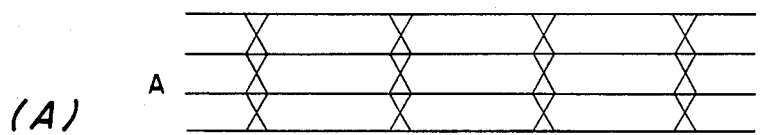
FIGS. 4(A)–4(E) show several signals used in the device depicted in FIG. 3.
Figure 4:
Figure 4:
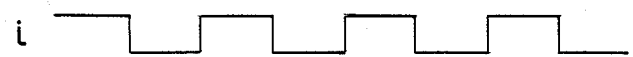
Figure 4:
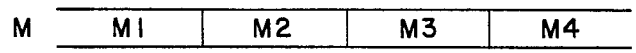
Figure 4:
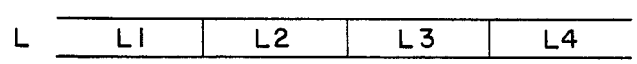
Figure 4:
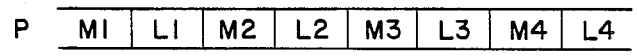

Referring more specifically to FIG. 3 and afresh to FIG. 4, the received signal will be designated by a reference symbol A. The received signal A has a level variable among four levels in the manner symbolically depicted in FIG. 4 at (A) in timed relation to the first timing clock sequence i.

The level discriminating circuit 31 comprises first through third comparators 56, 57, and 58 for comparing the received signal A with the first through the third signal discriminating reference voltages 21 to 23 to produce first through third results of comparison, respectively. The second result of comparison gives the first encoded signal which is of the type described above and will now be designated by M. Responsive to the first and the third results of comparison, an Exclusive OR gate 59 produces the second encoded signal depicted at L. The first and the second encoded signals M and L have binary 1 and 0 values in the manner shown in FIG. 4 at (B) where "21" through "23" are representative of voltages or levels of the signal discriminating reference voltages 21 through 23, respectively.

The signal decoding circuit 32 comprises first and second D flip-flops 61 and 62 controlled by the first timing clock sequence i and supplied with the first and the second encoded signals M and L to produce first and second Q output signals, respectively. An inverter 63 is for inverting the first timing clock sequence i to produce an inverted timing clock sequence. Responsive to the first Q output signal and the first timing clock sequence i, a first NAND gate 66 produces a first gate output signal. Responsive to the second Q output signal and the inverted timing clock sequence, a second NAND gate 67 produces a second gate output signal. Responsive to the first and the second gate output signals, a third NAND gate 68 supplies the device output terminal 12 with the decoded signal which is now indicated at P. In the manner illustrated in FIG. 4 at (C) as a time chart in combination with the first timing clock sequence i, the first and the second encoded signals M and L have binary values which are represented by M1, M2, and so forth and L1, L2, and others. The decoded signal P is a sequence of binary values or data M1, L1, M2, L2, and so on.

The multivalued signal regenerating circuit 33 is a multi-channel analog multiplexer known in the art. As symbolized by a single mechanical switch, the first and the second encoded signals M and L are used to switch the first through the fourth signal regenerating reference voltages 26 to 29 into the four-level regenerated signal which is indicated at R and has one of the signal regenerating reference voltages 26 through 29 at a time in compliance with the binary values of the first and the second encoded signals M and L in the manner exemplified in FIG. 4 at (D).

The comparator 34 comprises first and second unit comparators 71 and 72 for comparing the received signal A with the predetermined voltage and for comparing the received and the regenerated signals A and R with each other, respectively. First and second local results of comparison are produced by the respective unit comparators 71 and 72 in the manner shown in FIG. 4 at (E) along two leftside columns where the predetermined voltage is indicated by zero. Responsive to the first and the second local results of comparison, an Exclusive OR gate 73 produces a gate output signal S which indicates in the manner shown at (E) along a third column from the left whether an absolute value $|A|$ of the received signal A is greater or smaller than an absolute value $|R|$ of the regenerated signal R when the received signal A has a positive and a negative value relative to the predetermined voltage. An analog switch 74 is connected between the positive and the negative terminals $V_{DD}$ and $-V_{DD}$ and controlled by the gate output signal S to produce the result of comparison which is indicated at T and has positive and negative voltages designated by $V_{DD}$ and $-V_{DD}$, respectively. It will be understood that the result of comparison T has the positive and the negative voltages $V_{DD}$ and $-V_{DD}$ in the manner indicated at (E) along the rightmost column when the received signal absolute value $|A|$ is greater and smaller, respectively, than the regenerated signal absolute value $|R|$.

The integrator 35 comprises a resistor 76 which has a resistance R (the same reference symbol being used) and through which the result of comparison T charges a capacitor 77 of a capacitance C. An operational amplifier 78 has an amplifier output terminal, a first input terminal grounded, and a second input terminal connected to a point of connection between the resistor 76 and the capacitor 77. The capacitor 77 is connected between the second input terminal of the operational amplifier 78 and the output terminal thereof. The result of integration will be designated by U and is obtained at a point of connection of the capacitor 77 to the amplifier output terminal. The result of integration U is related to the result of comparison T by:

$$dU/dt = -T/(RC).$$

In the example being illustrated, the result of integration U is delivered to that point of the voltage divider which produces the fourth signal regenerating reference voltage 29 of a voltage nearest to the negative voltage $-V_{DD}$. In cooperation with the operational amplifier 52 of the reference voltage producing circuit 51, the result of integration U regulates the signal discriminating and regenerating reference voltages 21 through 23 and 26 through 29. The first through the fourth signal regenerating voltages 26 to 29 are rendered equal to −U. −U/3, U/3, and U, respectively. The first through the third signal discriminating reference voltages 21 to 23 are rendered equal to −2U/3, 0, and 2U/3, respectively. The signal discriminating and regenerating reference voltages 21 to 23 and 26 to 29 are subjected to feedback control in this manner to make the feedback-controlled signal regenerating reference voltages 26 through 29 keep the regenerated signal R always equal to the received signal A.

While this invention has thus far been described in conjunction with one embodiment thereof alone, it will now be readily possible for one skilled in the art to carry this invention into effect in various other manners. For example, the device is applicable to a receiver for a multivalued received signal which has more than four levels. In an extraordinary case where the multivalued received signal has an odd number of levels which are symmetric on both sides of a predetermined voltage, the operational amplifier 52 of the reference voltage producing circuit 51 should make the signal discriminating reference voltages, such as 21 through 23, have a center voltage at the predetermined voltage. Irrespective of the number of levels of the multivalued received signal, the result of integration U may be delivered to a different point of the voltage divider of the reference voltage producing circuit 51 with the comparator 34 and/or the integrator 35 modified accordingly. In any event, the result of integration U is used to regulate a predetermined one of the signal discriminating and regenerating voltages, for example, the fourth signal regenerating reference voltage 29.

What is claimed is:

1. A device for use in decoding a received multivalued signal to produce a decoded signal and including a reference voltage producing circuit for producing a plurality of signal discriminating reference voltages and a plurality of signal regenerating reference voltages which are related to one another, a level discriminating circuit responsive to said signal discriminating reference voltages for discriminating said received multivalued signal to produce a local encoded signal, a signal decoding circuit for decoding said local encoded signal into said decoded signal and, a multivalued signal regenerating circuit responsive to said local encoded signal for selecting one of said signal regenerating references voltages to produce a selected regenerated multivalued signal, wherein the improvement comprises a comparator for comparing the voltages of said received and said selected regenerated multivalued signals to produce a result of comparison, an integrator for integrating said result of comparison to produce a result of integration, and voltage regulating means responsive to said result of integration for simultaneously regulating said signal discriminating and regenerating reference voltages.

2. A device as claimed in claim 1, said received multivalued signal having a plurality of values which are symmetric on both sides of a predetermined value, wherein said reference voltage producing circuit comprises first means for producing an output voltage which makes said signal discriminating reference voltages have a center voltage at said predetermined value, and second means for producing said signal discriminating and regenerating reference voltages by voltage by voltage dividing said voltage, said voltage regulating means being coupled to said second means to regulate a predetermined one of said signal discriminating and regenerating reference voltages in response to said result of integration.

3. A device as claimed in claim 2, said multivalued received signal being a four-level received signal, wherein said voltage regulating means is for regulating said second means at a point giving one of said signal regererating reference voltages that is lowest of said signal regenerating reference voltages.

4. A device for use in decoding a received multivalued signal to produce a decoded signal, said device comprising:
level discriminating means for discriminating said received multivalued signal in accordance with a plurality of first reference voltages;
signal decoding means for decoding the output of said level discriminating means to form said decoded signal;
multivalued signal regenerating means responsive to the output of said level discriminating means for selecting one of a plurality of second reference voltages to produce a regenerated multivalued signal;
comparing means for comparing the voltages of said received multivalued signal and said regenerated multivalued signal;
integrator means for integrating the output of said comparing means; and
reference voltage producing circuit means for producing said first and second reference voltages and for simultaneously regulating these voltages, responsive to the output of said integrator means.

5. A device as claimed in claim 4, wherein said comparing means comprises a comparator means for comparing the voltages of said received and regenerated multivalued signals to produce a result of comparison, and an integrator means for integrating said result of comparison to produce a result of an integration which is supplied to said reference voltage producing means as the output of said comparing means.

* * * * *